Jan. 28, 1930. A. H. BRACKENSEY 1,744,721

REFLECTING UNIT FOR SIGNS AND THE LIKE

Filed Sept. 22, 1927

Inventor:
Aug. H. Brackensey.
per: N. P. Bowden
Attorney.

Patented Jan. 28, 1930

1,744,721

UNITED STATES PATENT OFFICE

AUGUSTE HARRY BRACKENSEY, OF LONDON, ENGLAND, ASSIGNOR TO THE FRANCO-BRITISH ELECTRICAL COMPANY, LIMITED, OF LONDON, ENGLAND, A COMPANY OF ENGLAND

REFLECTING UNIT FOR SIGNS AND THE LIKE

Application filed September 22, 1927, Serial No. 221,366, and in Great Britain November 11, 1926.

This invention relates to light reflecting units for signs, signals and the like in which bi-convex lenses are arranged in combination with metal or other concave reflectors so that the reflectors and lenses have common optical axes.

Objects of this invention are to improve the construction and arrangement of such light reflecting devices so as to increase the optical efficiency thereof and render the same visible through a wide angle of aspect.

According to the present invention a reflecting device comprises a bi-convex lens, the faces of which are of different curvature, and a concave reflector, the curvature of which is intermediate the curvatures of the lens faces; such reflector being arranged behind the lens face of least curvature and in alignment with the optical axis of the lens, while to obtain colour effects either the lens or the reflector, or both, may be coloured or tinted, or a translucent colour screen may be arranged between the concave reflector and the adjacent convex surface of the lens.

The lens may be either simple or compound, and be of cylindrical or prismatical form with terminal convex faces of unequal curvature, or the lens may be of a spheroidal or bead-like form with opposite convex lens faces of unequal curvature.

In either construction the front convex surface is formed to a radius which is preferably less than half the axial length of the lens, and the opposite or rear lens face is formed to a greater radius which may be approximately three to four times as great as the front convex lens surface, while the convex reflector is formed to a radius which is intermediate the radii of the front and rear convex lens faces.

When the lens is of compound construction the back or rear end of the lens may be made in a heavy flint glass, and the front portion of the lens in ordinary standard glass, the two parts being fused or cemented together in known manner so as to minimize spherical aberration. In practice, however, lenses made entirely of good standard glass are found to be satisfactory for most conditions and have the advantage of being much cheaper to produce.

When the lens body is of cylindrical form its front convex surface may be formed with rounded edges where it springs from the sides of the lens body, so that in longitudinal section the front convex surface of the lens approximates to an ellipsoidal contour, while the cylindrical body may be slightly tapered and be formed with one or more annular grooves or collars to facilitate fixing the same in a sign or other support.

When the lens body is in the form of a bead, the front portion thereof is of smaller diameter than the rear portion so that a shoulder is formed at the junction of these two unequal parts of the lens.

The convex surface of the smaller front portion of the lens body forms the front convex surface of the lens, while the convex surface of the larger rear portion of the lens body forms or comprises the rear convex lens face. For this purpose the rear convex surface of the lens body may be formed to the required radius to form the rear convex lens face. Alternatively, the rear convex lens body may be formed in concentric zones of different curvatures. The central zone is formed to the radius required to form the rear convex lens face, while the co-axial outer zone is curved to the radius of the larger portion of the lens body.

The concave reflector may comprise a flanged metal cap adapted to be mounted upon the back of the lens so that its concave reflecting surface is adjacent to the rear convex surface of the lens, while the radius of the reflector preferably approximates more closely to the radius of the front convex surface of the lens than to that of the rear convex surface adjacent to which the reflector is arranged.

When the rear face of the lens is formed with co-axial zones of different curvatures, it is preferably backed with a concave reflector formed with reflecting zones of different curvatures. The central zone of the reflector is of equal diameter to the central zone of the rear lens surface, while the curvature of such central reflecting zone is intermediate the curvatures of the convex front and rear lens faces.

The curvature of the co-axial outer reflecting zone corresponds to the curvature of the outer zone of the rear face of the lens body. The outer zone of the reflector thus forms a cup-like extension which fits over the corresponding portion of the rear surface of the lens body and serves to reflect incident light rays which enter the front convex lens surface at too great an angle to reach the central zone of the reflector.

The invention is illustrated by way of example in the accompanying drawings, wherein:—

Figure 1:
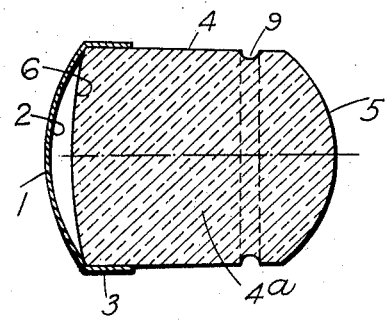
Figs. 1 and 2 are longitudinal sectional views of a reflecting device comprising a cylindrical bi-convex lens and concave reflector constructed in accordance with the present invention.

The reflecting device comprises a concave reflector 1 and a bi-convex lens 4, the terminal convex faces 5 and 6 of which are of unequal curvatures, while the concave reflecting surface 2 of the reflector 1 has a curvature which is intermediate the curvatures of the front convex surface 5 and the rear convex surface 6 of the bi-convex lens.

Figure 2:
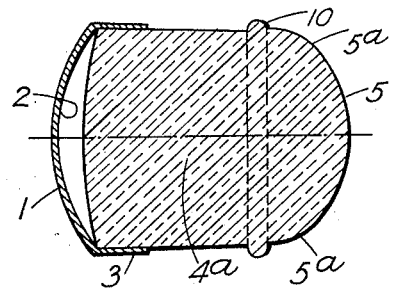
Figure 4:
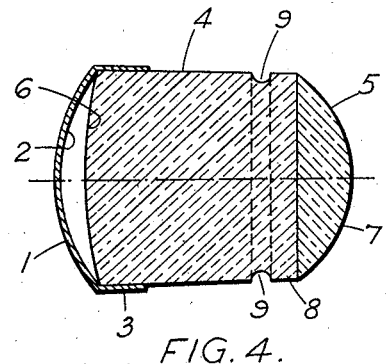
Figs. 4 and 5 are diagrammatic sectional views in which the bi-convex lenses are of known compound construction.

As illustrated at Figs. 1, 2 and 4, the lens comprises a cylindrical body 4ª, the front convex surface 5 of which is formed to a radius that is rather less than half the axial length of the lens, while its rear convex surface 6 is formed to a radius which is approximately three times that of the front convex surface 5.

The concave reflector 1 is in the form of a cap which is provided with an annular flange 3 that is adapted to clip over the rear end of the lens body.

The concave reflecting surface 2 is formed to a radius which is rather less than the radius of the rear convex surface 6 of the lens so that the curvature of the concave reflecting surface 2 approximates to that of the front convex lens surface 5.

In the construction illustrated at Fig. 2, the front convex surface 5 of the lens is formed with rounded edges 5ª where it springs from the lens body, so that the front convex surface 5 of the lens is of an ellipsoidal contour, as illustrated.

In the construction illustrated at Fig. 4, the lens is of compound construction, the front portion 7 being made for example in heavy flint glass, while the rear portion 8 is formed of ordinary standard glass, the two parts being fused or cemented together in known manner.

As illustrated at Figs. 1, 2 and 4, the cylindrical lens body 4ª is tapered from back to front, and may be formed with annular grooves such as 9 (Fig. 1), or annular collars such as 10 (Fig. 2), to facilitate assembling the same in a suitable support to form a sign or signal.

Figure 3:
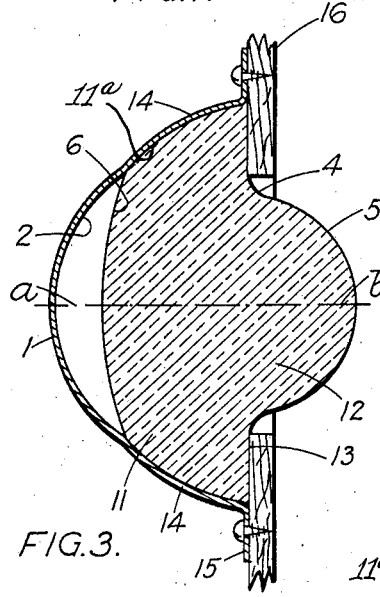
Fig. 3 is a longitudinal sectional view illustrating a modified construction in which the bi-convex lens is in the form of a bead having convex surfaces of unequal radii arranged in combination with a concave reflector in accordance with the present invention.
Figure 5:
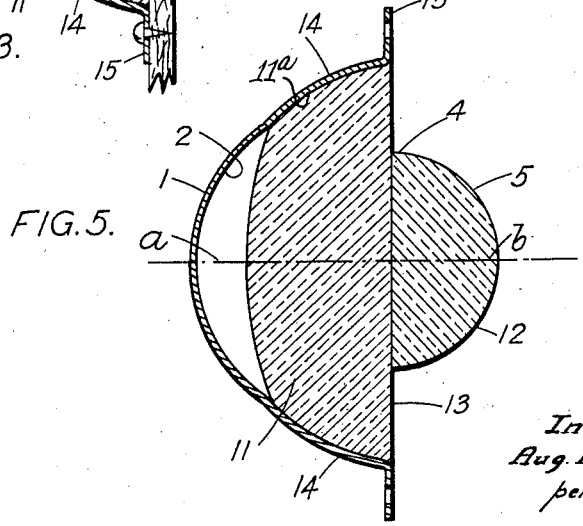

Figs. 3 and 5 illustrate modified constructions of the improved reflecting device wherein the lens is in the form of a bead having terminal convex faces 5 and 6 of unequal curvatures.

As illustrated, the front portion 12 of the lens body is of smaller diameter than the rear portion 11, so that a shoulder 13 is formed between the rear and front portions 11 and 12. The front convex face 5 of the lens is comprised in the surface of the smaller portion 12. The convex surface of the larger rear portion 11 of the lens body is formed with two co-axial zones of unequal curvature. The central zone forms the rear convex lens surface 6, the radius of which latter is rather more than twice the radius of the front convex lens surface 5, while the co-axial outer zone 11ª is curved to the radius of the larger rear portion 11 of the lens body, as indicated.

The concave reflector 1 is also formed with co-axial reflecting zones 2 and 14 of different curvatures. The central zone 2 has a diameter equal to the diameter of the rear convex lens surface 6 and is mounted in axial alignment with the latter, while the co-axial outer zone 14 is formed to the same radius as the corresponding zone 11ª of the rear surface of the lens body.

The outer co-axial zone 14 forms a cup-like extension of the concave reflector 1 and forms a housing for the rear portion 11 of the lens, and also an auxiliary reflector for incident light rays entering the front convex lens 5 at too great an angle to reach the main central convex reflecting zone 2.

The extension 14 of the reflector 1 may be furnished with perforated lugs 15, by which the reflecting device comprising the bi-convex lens and concave reflector, may be secured to a suitable frame or support indicated at 16, so that the reflector and lens are secured in correct optical alignment.

In the construction illustrated at Fig. 5, the bead-like lens is of compound construction, the front portion 12 being formed of denser glass than the rear portion 11.

I claim:—

1. A light reflecting device of the class described, comprising a bi-convex lens having a convex front face and, the faces of which are of different curvatures, and a concave reflector arranged behind the lens face of least curvature and in optical alignment with the lens, the curvature of the reflector approximating the curvature of the convex front face of the lens.

2. A light reflecting device as claimed in claim 1, in which the lens is a bi-convex lens one convex face of which has a radius less than half the axial length of the lens, while its opposite convex face has a radius which is an approximate multiple of the radius of the first convex face.

3. A light reflecting device, as claimed in claim 1, in which the lens is a cylidrical bi-convex lens having lens faces of different curvatures, and the concave reflector has a radius intermediate the radii of the convex lens faces; and comprises a flanged metal cap adapted to be mounted on the lens behind the face of least curvature and in optical alignment therewith.

4. A light reflecting device, as claimed in claim 1, in which the lens is a cylindrical bi-convex lens the faces of which are of different curvatures, and the concave reflector has a curvature intermediate the curvatures of the lens faces; and said bi-convex lens is tapered and formed with means for securing same in a support, and said reflector comprises a flanged metal cap adapted to be assembled to the lens behind the face of least curvature and in optical alignment therewith.

5. A light reflecting device as claimed in claim 1, in which the lens is a cylindrical bi-convex lens having its faces of different curvatures, and the lens face of greatest curvature is rounded off at its edges so that said convex surface approximates an ellipsoidal contour in longitudinal section, and the concave reflector has a radius intermediate the radii of the convex lens faces; and said reflector is mounted behind the lens face of least curvature and in optical alignment therewith.

6. A light reflecting device as claimed in claim 1, in which the lens is a compound bi-convex lens having its convex faces formed of different curvatures, and the concave reflector has a curvature intermediate the curvatures of the lens faces; and said reflector is arranged adjacent the lens face of least curvature and in optical alignment with the lens.

In testimony whereof I affix my signature.

AUGUSTE HARRY BRACKENSEY.